United States Patent
Yoon et al.

(10) Patent No.: US 10,139,932 B2
(45) Date of Patent: Nov. 27, 2018

(54) ELECTRONIC DEVICE AND CONTROL METHOD THEREFOR

(71) Applicant: SAMSUNG ELECTRONICS CO., LTD., Suwon-si, Gyeonggi-do (KR)

(72) Inventors: Yeo-Jun Yoon, Seoul (KR); Yun-Kyung Kim, Suwon-si (KR); Ji-Yeon Kwak, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/398,931

(22) Filed: Jan. 5, 2017

(65) Prior Publication Data

US 2017/0192529 A1    Jul. 6, 2017

(30) Foreign Application Priority Data

Jan. 5, 2016    (KR) ........................ 10-2016-0000897

(51) Int. Cl.
*G06F 3/038* (2013.01)
*G06F 3/0488* (2013.01)
*G06F 1/16* (2006.01)

(52) U.S. Cl.
CPC .............. *G06F 3/038* (2013.01); *G06F 1/169* (2013.01); *G06F 3/0488* (2013.01); *G06F 2203/0381* (2013.01)

(58) Field of Classification Search
None
See application file for complete search history.

(56) References Cited

U.S. PATENT DOCUMENTS

2013/0300668 A1* 11/2013 Churikov ................ G06F 3/041
345/168
2014/0218309 A1*  8/2014 Park ...................... G06F 1/1626
345/173

FOREIGN PATENT DOCUMENTS

KR         10-1418285      7/2014
KR       10-2014-0100335   8/2014
KR         10-1510703      4/2015

* cited by examiner

*Primary Examiner* — Christopher Kohlman
(74) *Attorney, Agent, or Firm* — Nixon & Vanderhye P.C.

(57) ABSTRACT

According to various example embodiments, an electronic device may include: a touch screen disposed on a first surface of the electronic device and configured to receive a first input; an auxiliary input device disposed on a second surface of the electronic device and configured to receive a second input; a sensor module configured to detect a grip area with respect to the electronic device; and a processor configured to determine a first area of the touch screen based on the grip area and to display a pointer on the first area, when the second input is received through the auxiliary input device.

16 Claims, 15 Drawing Sheets
(1 of 15 Drawing Sheet(s) Filed in Color)

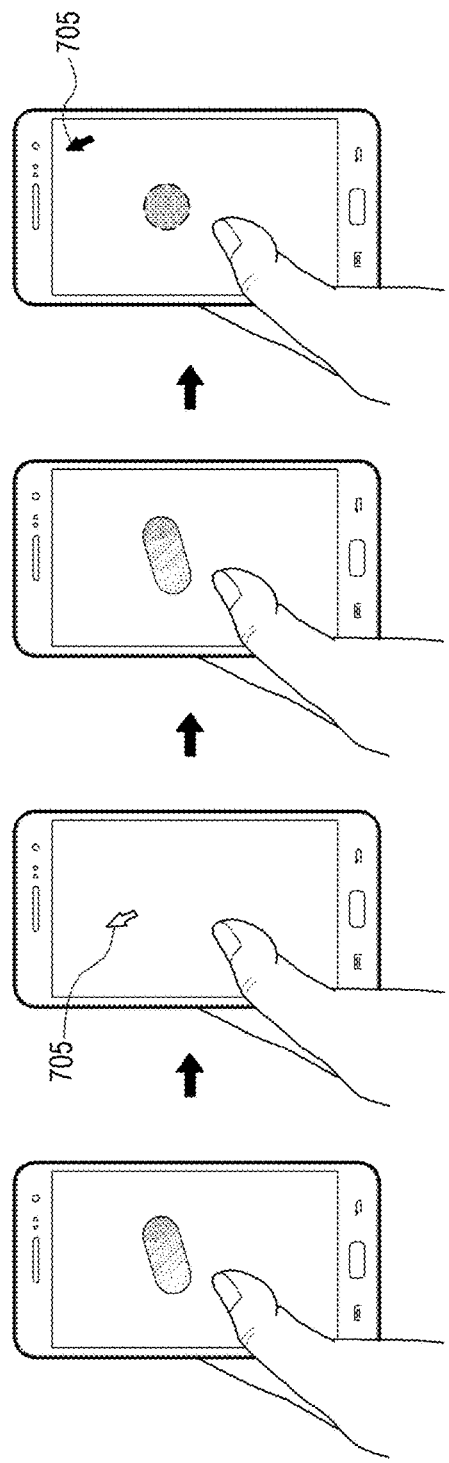

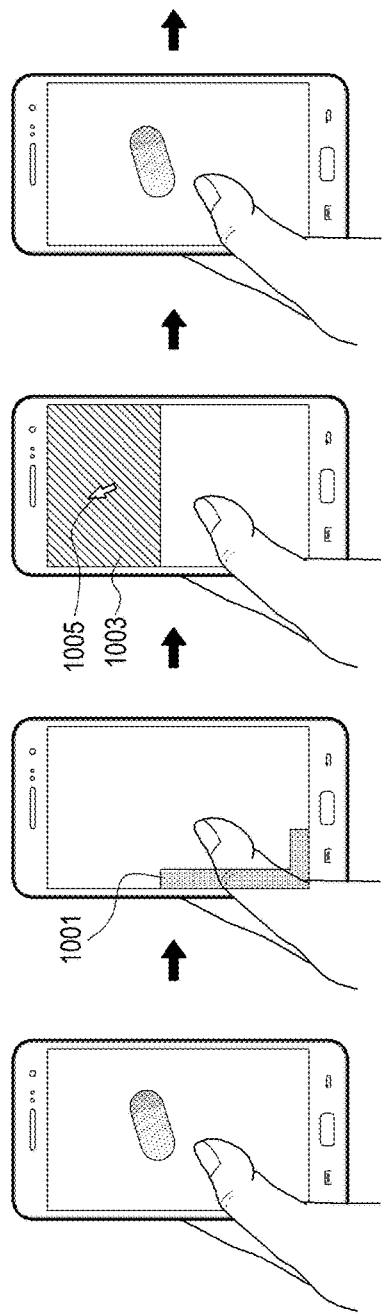

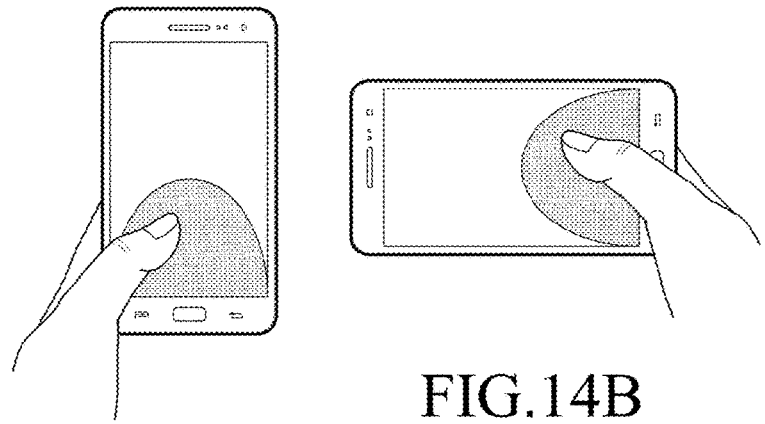
FIG.14A
(PRIOR ART)
FIG.14B
(PRIOR ART)
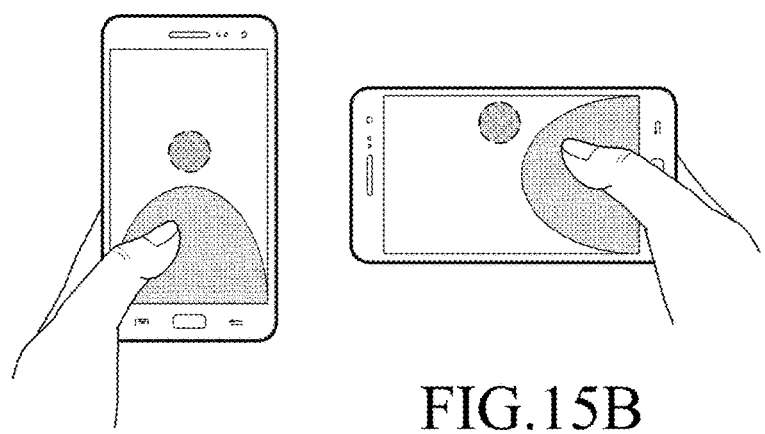
FIG.15A
(PRIOR ART)
FIG.15B
(PRIOR ART)

ELECTRONIC DEVICE AND CONTROL METHOD THEREFOR

CROSS-REFERENCE TO RELATED APPLICATION

This application is based on and claims priority under 35 U.S.C. § 119 to Korean Application Serial No. 10-2016-0000897, which was filed in the Korean Intellectual Property Office on Jan. 5, 2016, the content of which is incorporated by reference herein in its entirety.

TECHNICAL FIELD

The present disclosure relates generally to an electronic device and a control method therefor.

BACKGROUND

An electronic device may execute various functions or programs. For example, portable electronic devices such as a smart phone and a tablet PC have been developed to implement advanced performance and give a user convenience. Accordingly, the portable electronic devices have been commonly used.

A portable electronic device is manufactured to be light and in a small size, so that a user can carry and use the device at all times. In addition, most of current portable electronic devices have a touch screen on which a touch panel is mounted. Accordingly, a user can select and use a specific function of a portable electronic device, for example, a specific application through a simple touch input. Furthermore, research has been steadily carried out to improve simplicity of a touch input by a user.

In a case where a user operates an electronic device using his/her one hand, for example, when the user grips the electronic device using one hand and then controls a touch screen placed on the front surface of the electronic device using fingers of the hand which grips the electronic device, there may be an area of the touch screen which cannot be reached by the fingers. For example, as shown in FIGS. 14A and 14B, when the user operates the electronic device using one hand, the user may grip the electronic device in a horizontal direction or a vertical direction. Referring to FIGS. 14A and 14B, the thumb of the hand which grips the electronic device may touch only a partial area of the touch screen. Accordingly, conventionally, when the user operates the electronic device using one hand, the user cannot control an upper area of the touch screen which cannot be reached by his/her fingers.

Conventionally, there has been a technology which controls the front display of the electronic device by touching on the back surface of the electronic device as shown in FIGS. 15A and 15B. However, when the user controls the front display of the electronic device using his/her forefinger or middle finger, positioned on the back surface, due to the limitation of a position to which the forefinger or the middle finger can move on the back surface of the electronic device depending on a size of the electronic device, a partial area of the front display, which cannot be controlled, may exist.

SUMMARY

Accordingly, various example embodiments provide an electronic device for simply and conveniently controlling a touch screen of the front surface of the electronic device using an auxiliary input device disposed on a back surface of the electronic device, and a control method therefor.

In addition, various example embodiments provide an electronic device and a control method therefor, wherein the electronic device controls an area on a touch screen which cannot be reached by a user's fingers by using an auxiliary input device disposed on the back surface of the electronic device, when a user operates the electronic device using one hand, in a case where the area which cannot be reached by the fingers exists on the touch screen placed on the front surface of the electronic device.

An electronic device according to various example embodiments may include: a touch screen disposed on a first surface of the electronic device and configured to receive a first input; an auxiliary input device comprising input circuitry disposed on a second surface of the electronic device and configured to receive a second input; a sensor module configured to detect a grip area of the electronic device; and a processor configured to determine a first area of the touch screen based on the grip area and to display a pointer on the first area, when the second input is received through the auxiliary input device.

A method for controlling an electronic device according to various example embodiments may include operations comprising: detecting a grip area of the electronic device; when a first input is received through an auxiliary input device placed on a second surface of the electronic device, determining a first area of a touch screen positioned on a first surface of the electronic device, based on the grip area; and displaying a pointer on the first area.

An electronic device and a control method therefor according to various example embodiments can simply and conveniently control a touch screen on the front surface of the electronic device using an auxiliary input device placed on the back surface of the electronic device.

In addition, an electronic device and a control method therefor according to various example embodiments can control an area, which cannot be reached by a user's fingers on a touch screen using an auxiliary input device disposed on the back surface of the electronic device, when a user operates the electronic device using one hand, in a case where the area which cannot be reached by the fingers exists on the touch screen placed on the front surface of the electronic device.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features, and attendant advantages of the present disclosure will be more apparent from the following detailed description, taken in conjunction with the accompanying drawings, in which like reference numerals refer to like elements, and wherein:

FIGS. 7A, 7B, 7C and 78D are diagrams illustrating example control of an electronic device according to various example embodiments;

FIGS. 10A, 10B, 10C, 10D, 10E, 10F, 10G and 10H are diagrams illustrating example control of an electronic device according to various example embodiments;

FIGS. 14A, 14B, 15A and 15B are diagrams illustrating examples of a touchable area of a touch screen when an electronic device is operated using one hand according to the prior art.

DETAILED DESCRIPTION

Figure 1:
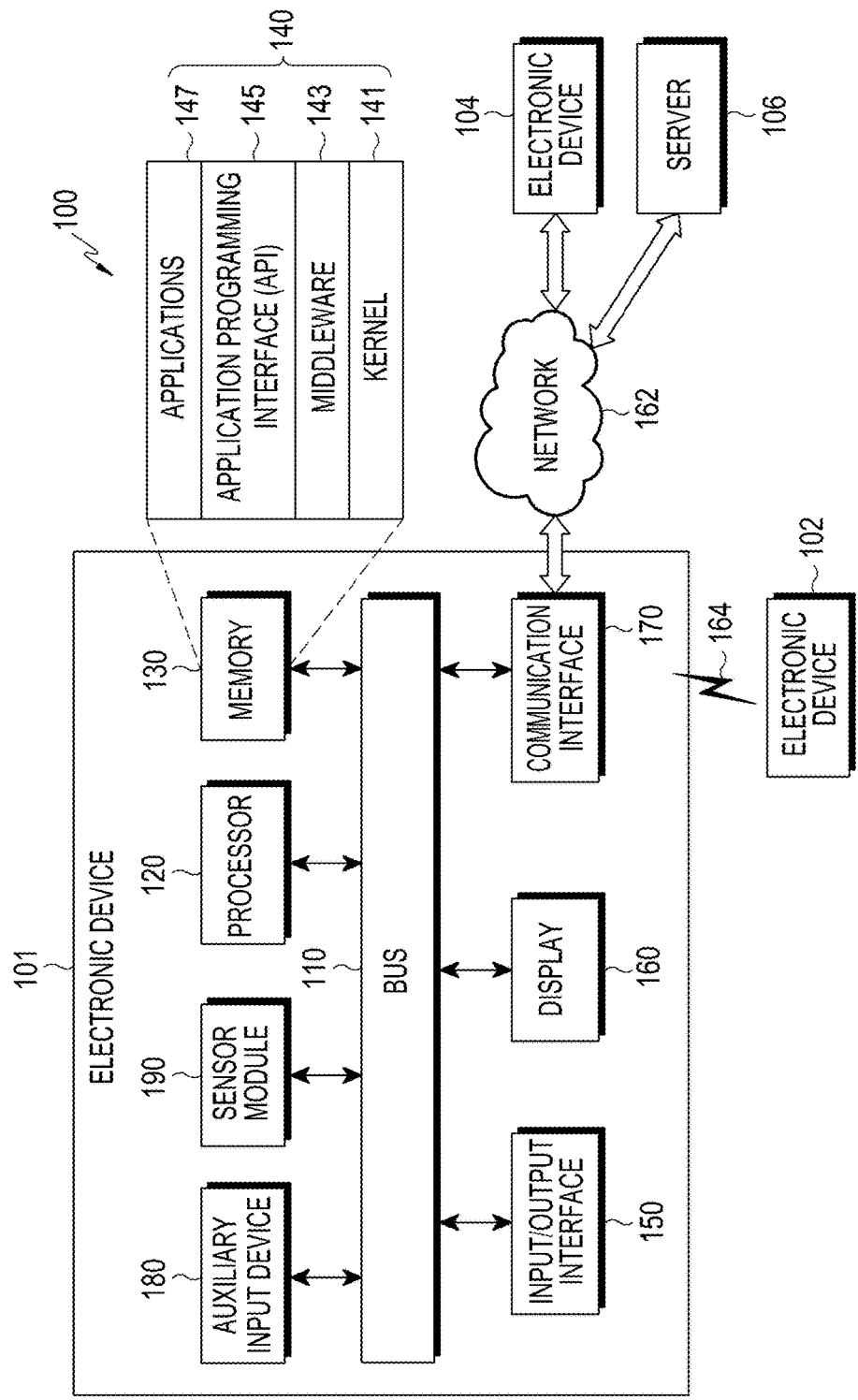
FIG. 1 is a diagram illustrating an example network environment including an electronic device according to various example embodiments.

Hereinafter, various example embodiments of the present disclosure will be described in greater detail with reference to the accompanying drawings. However, it should be understood that there is no intent to limit the present disclosure to the particular forms disclosed herein; rather, the present disclosure should be understood to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. On the other hand, it may be understood that when an element (e.g., first element) is referred to as being "directly connected," or "directly coupled" to another element (second element), there are no element (e.g., third element) interposed between them.

The expression "configured to" used in the present disclosure may be used interchangeably with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may refer to a situation in which the device, together with other devices or components, "is able to". For example, the phrase "processor adapted (or configured) to perform A, B, and C" may refer, for example, to a dedicated processor (e.g., embedded processor) for performing the corresponding operations or a generic-purpose processor (e.g., central processing unit (CPU) or application processor (AP)) that can perform the corresponding operations by executing one or more software programs stored in a memory device.

The terms used in the present disclosure are used to describe specific embodiments, and are not intended to limit the present disclosure. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even if the term is defined in the present disclosure, it should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like, but is not limited thereto.

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame, or the like, but is not limited thereto.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto.

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter), or the like, but is not limited thereto. The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

An electronic device 101 within a network environment 100, according to various example embodiments, is described with reference to FIG. 1. The electronic device 101 may include a bus 110, a processor (e.g., including processing circuitry) 120, a memory 130, an input/output interface (e.g., including input/output circuitry) 150, a display 160, a communication interface (e.g., including communication circuitry) 170, an auxiliary input device (e.g., including input circuitry) 180, and a sensor module 190. In some embodiments, the electronic device 101 may omit at least one of the elements, or may further include other elements.

The bus 110 may include, for example, a circuit which interconnects the components 110 to 190 and delivers communication (for example, a control message and/or data) between the components 110 to 190.

The processor 120 may include various processing circuitry, such as, for example, and without limitation, one or more of a dedicated processor, a Central Processing Unit (CPU), an Application Processor (AP), and a Communication Processor (CP). The processor 120, for example, may carry out operations or data processing relating to the control and/or communication of at least one other element of the electronic device 101.

The memory 130 may include a volatile and/or non-volatile memory. The memory 130 may store, for example, instructions or data relevant to at least one other element of the electronic device 101. According to an embodiment, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (for example, the bus 110, the processor 120, or the memory 130) used for executing an operation or function implemented by other programs (for example, the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data.

Furthermore, the middleware 143 may process one or more task requests, which are received from the application programs 147, according to priorities thereof. For example, the middleware 143 may assign priorities for using the system resources (for example, the bus 110, the processor 120, the memory 130, etc.) of the electronic device 101 to one or more of the application programs 147. For example, the middleware 143 may perform scheduling or loading balancing on the one or more task requests by processing the one or more task requests according to the priorities assigned to the one or more application programs.

The API 145, which is an interface through which the applications 147 control functions provided from the kernel 141 or the middleware 143, may include, for example, at least one interface or function (for example, instruction) for file control, window control, image processing, text control, etc.

The input/output interface 150 may include various input/output circuitry configured to function as, for example, an interface that can forward instructions or data, which are input from a user or an external device, to the other element(s) of the electronic device 101. Furthermore, the input/output interface 150 may output instructions or data, which are received from the other element(s) of the electronic device 101, to the user or the external device.

Examples of the display 160 may include a Liquid Crystal Display (LCD), a Light-Emitting Diode (LED) display, an Organic Light-Emitting Diode (OLED) display, a MicroElectroMechanical Systems (MEMS) display, and an electronic paper display, or the like, but is not limited thereto. The display 160 may display, for example, various types of contents (for example, text, images, videos, icons, symbols, etc.) for a user. The display 160 may include a touch screen and may receive, for example, a touch, gesture, proximity, or hovering input using an electronic pen or the user's body part.

The communication interface 170 may include various communication circuitry provided to configure communication, for example, between the electronic device 101 and an external device (for example, a first external electronic device 102, a second external electronic device 104, or a server 106). For example, the communication interface 170 may be connected to a network 162 through wireless or wired communication to communicate with the external device (for example, the second external electronic device 104 or the server 106).

The wireless communication may use, for example, at least one of Long Term Evolution (LTE), LTE-Advance (LTE-A), Code Division Multiple Access (CDMA), Wideband CDMA (WCDMA), Universal Mobile Telecommunications System (UNITS), WiBro (Wireless Broadband), Global System for Mobile Communications (GSM), and the like, as a cellular communication protocol. In addition, the wireless communication may include, for example, short range communication 164. The short range communication 164 may include at least one of, for example, Wi-Fi, Bluetooth, Near Field Communication (NFC), Global Navigation Satellite System (GNSS), etc. The GNSS may include at least one of, for example, a Global Positioning System (GPS), a Global Navigation Satellite System (Glonass), a Beidou Navigation Satellite System (hereinafter referred to as "Beidou"), and the European Global Satellite-based Navigation System (Galileo), according to a use area, a bandwidth, or the like. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), a Plain Old Telephone Service (POTS), etc. The network 162 may include at least one of a communication network such as a computer network (e.g., a LAN or a WAN), the Internet, and a telephone network.

Each of the first and second external electronic devices 102 and 104 may be of the same or a different type from the electronic device 101. According to an embodiment, the server 106 may include a group of one or more servers. According to various embodiments, all or some of the operations performed in the electronic device 101 may be performed in another electronic device or a plurality of electronic devices (e.g., the electronic devices 102 and 104 or the server 106). According to an embodiment, when the electronic device 101 has to perform some functions or services automatically or in response to a request, the electronic device 101 may request another device (for example, the electronic device 102 or 104 or the server 106) to perform at least some functions relating thereto instead of, or in addition to, performing the functions or services by itself. The other electronic device (for example, the electronic device 102 or 104 or the server 106) may perform the requested functions or the additional functions and may transfer the execution result to the electronic device 101. The electronic device 101 may provide the received result as it is, or may additionally process the received result to provide the requested functions or services. To this end, for example, cloud computing, distributed computing, or client-server computing technology may be used.

The auxiliary input device 180 may include various input circuitry configured to receive an input (e.g., a user's input).

Figure 2:
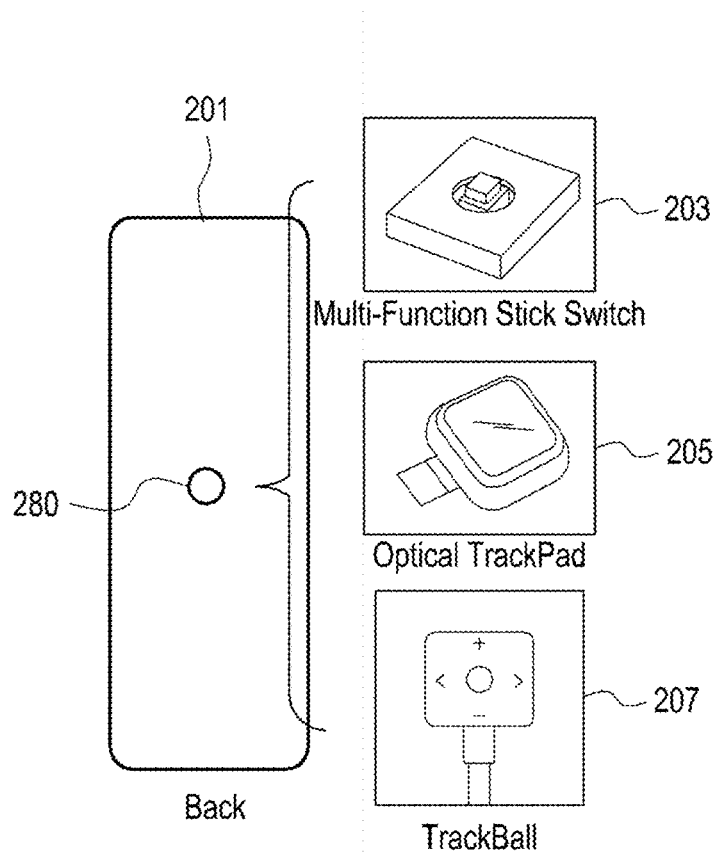
FIG. 2 is a diagram illustrating an example auxiliary input device placed on the back surface of an electronic device according to various example embodiments.

Referring to FIG. 2, an auxiliary input, 280, may be disposed on the back surface of an electronic device 201. In addition, the auxiliary input device 280 may be disposed at a specific position, for example, on the central portion of the back surface of the electronic device 201, based on positions of a user's fingers positioned on the back surface of the electronic device 201 when a user grips the electronic device 201. In addition, the auxiliary input device 280 may move a pointer displayed on the display 160, like a mouse, and may be used to select an icon, move an icon, or execute a function corresponding an icon, according to a user's operation. In addition, the auxiliary input device 280 may include various input circuitry, such as, for example, and without limitation, a multi-function stick switch 203, a trackpad 205, a trackball 207, and a touch screen (not shown).

The multi-function stick switch 203 may refer, for example, to an operating lever type input device. A stick of the multi-function stick switch 203 may move in up, down, left, and right directions according to a user's operation, and information on the movement may be transmitted to the electronic device 201. In addition, the stick of the multi-function stick switch 203 may be pushed or released according to a user's operation, and signals generated at this time may be transmitted to electronic device 201.

The trackpad 205 may detect an input of a finger or a pen so as to convert the input to digital signals, and converted signals may be transmitted to the electronic device 201. In addition, the trackpad 205 may be an optical trackpad.

The trackball 207 may generate digital signals according to an operation of the ball by a user, and the digital signals may be transmitted to electronic device 201. For example, the trackball 207 may generate digital signals according to the movement direction of the ball when a user rolls the ball with his/her finger. In addition, the trackball 207 may generate digital signals as a user pushes the ball or releases the ball.

When a user grips the electronic device 101, the sensor module 190 may include at least one sensor which can detect the user's grip. The sensor module 190, for example, may include at least one of a plurality of pressure-sensitive sensors (not shown), a plurality of touch sensors (not shown), and a plurality of proximity sensors (not shown).

The pressure-sensitive sensors may detect pressure applied by an external force. In addition, the pressure-sensitive sensors may be disposed in a bezel portion of the electronic device 101 at predetermined intervals in consideration of the entire size of the electronic device 101.

The touch sensors may, for example, be operated in a capacitance change scheme, an electric conductivity change scheme (a resistance change scheme), a light amount change scheme, or the like, and may detect a touch. In addition, the touch sensors may be disposed in the bezel portion of the electronic device 101 at predetermined intervals in consideration of the entire size of the electronic device 101.

The proximity sensors may detect a proximity of an object (for example, a user's finger) which approaches the electronic device 101. In addition, the proximity sensors may be disposed in the bezel portion of the electronic device 101 at predetermined intervals in consideration of the entire size of the electronic device 101.

Figure 3:
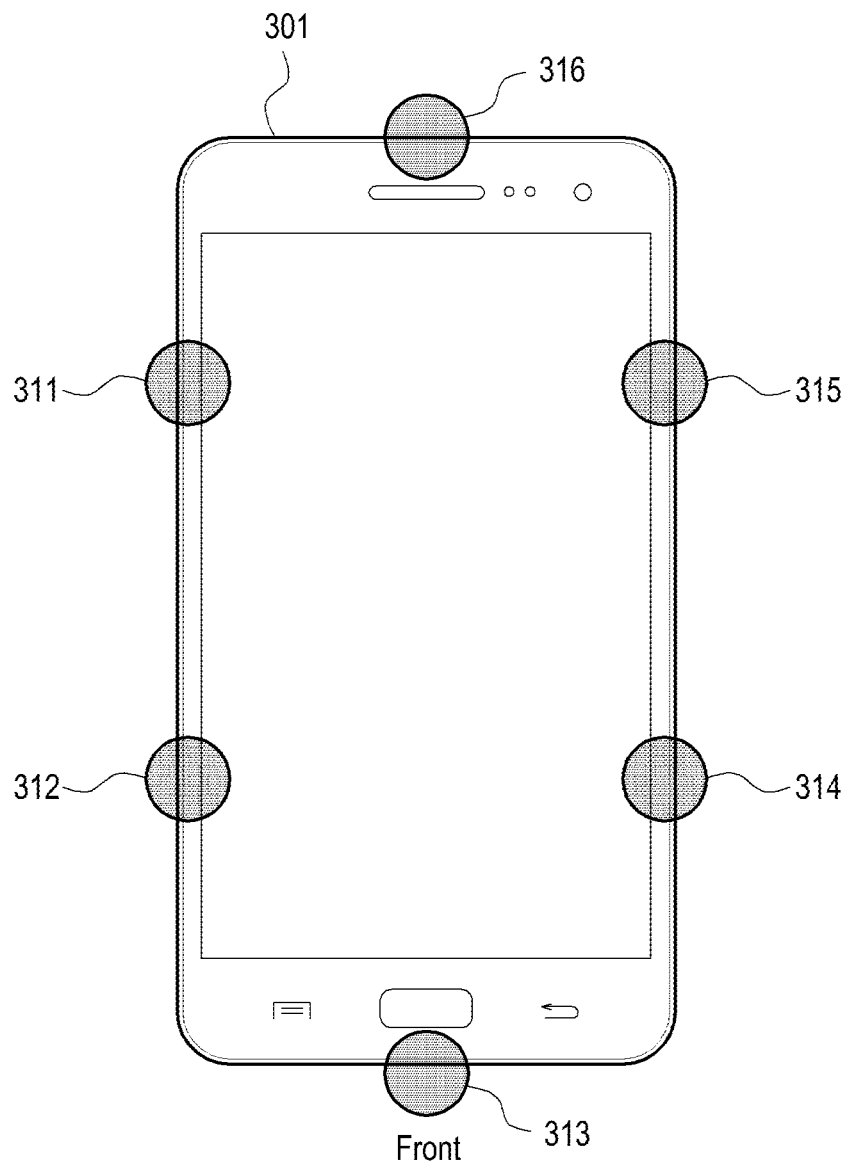
FIG. 3 is a diagram illustrating an example sensor module configured to detect a grip area of an electronic device according to various example embodiments.

Referring to FIG. 3, touch sensors 311, 312, 313, 314, 315 and 316 or the proximity sensors 311, 312, 313, 314, 315 and 316 may be arranged, for example, in an edge portion of a bezel of the electronic device 301 at predetermined intervals. It will be understood that the disclosure is not limited to this example arrangement.

According to various embodiments, an electronic device (for example, the electronic device 101) may include: a touch screen (for example, the display 160) placed on a first surface of the electronic device to receive a first input; an auxiliary input device (for example, the auxiliary input device 180) placed on a second surface of the electronic device to receive a second input; a sensor module (for example, the sensor module 190) configured to detect a grip area with respect to the electronic device; and a processor (for example, the processor 120) configured to determine a first area of the touch screen on the basis of the grip area and display a pointer on the first area, when the second input is received through the auxiliary input device.

According to various embodiments, the sensor module may include a plurality of pressure-sensitive sensors, a plurality of touch sensors, or a plurality of proximity sensors, which are arranged in a bezel of the electronic device.

According to various embodiments, the processor may display the pointer on the center of the first area.

According to various embodiments, when an input is not received through the auxiliary input device during a predetermined time after displaying the pointer, the processor may control to terminate the displaying of the pointer.

According to various embodiments, the auxiliary input device may be a multi-function stick switch, a touch screen, a trackpad, or a trackball.

According to various embodiment, when a third input is received through the auxiliary input device, the processor may control to display a movement of the pointer in response to the third input.

According to various embodiments, when an input for selecting an icon at a position of the pointer is received through the auxiliary input device, the processor may control to allow the pointer to select the icon.

According to various embodiments, when a drag input with respect to the selected icon is received through the auxiliary input device, the processor may control to display the dragging of the selected icon in response to the drag input.

Figure 4:
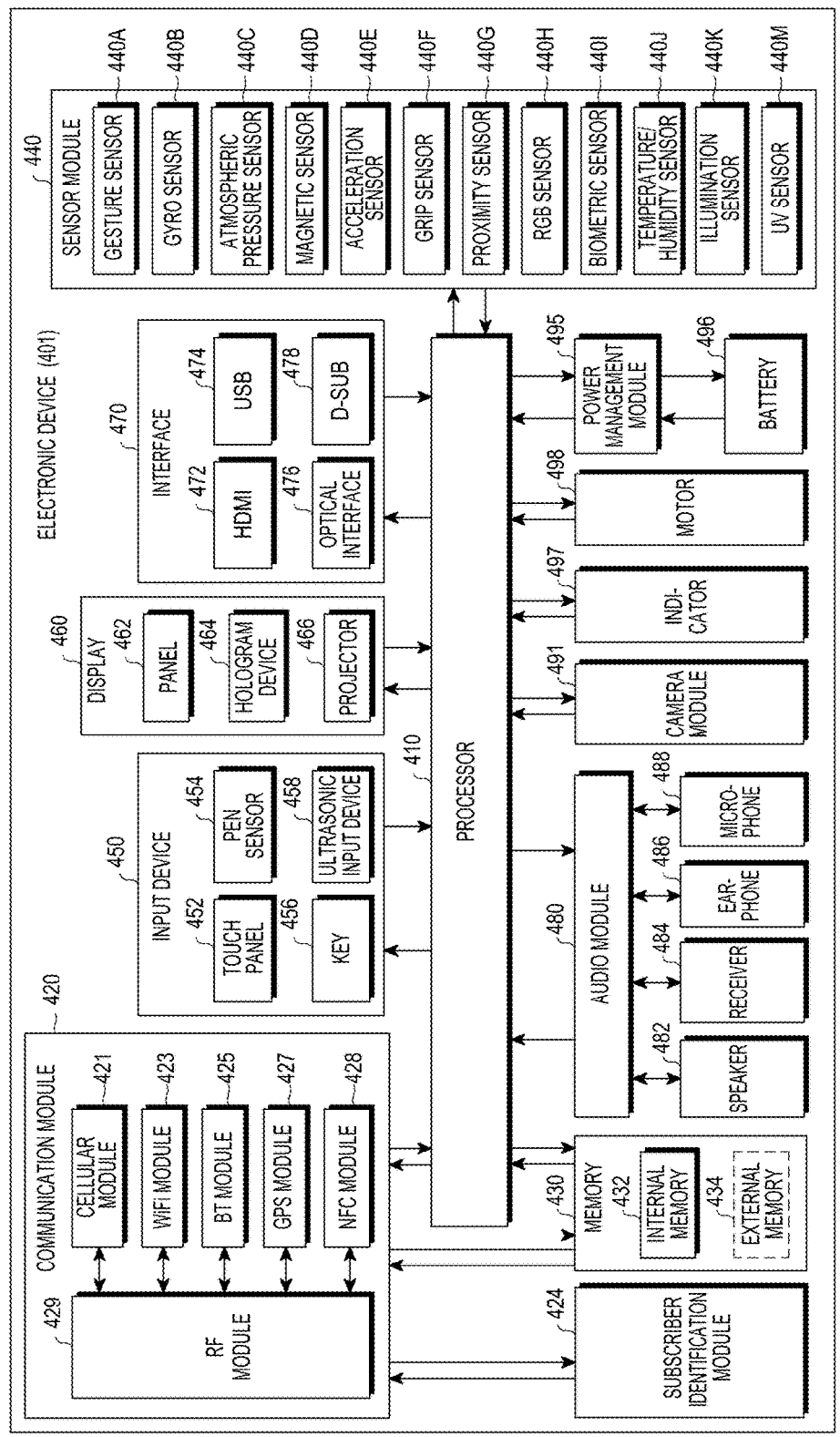
FIG. 4 is a block diagram illustrating an example electronic device according to various example embodiments.

FIG. 4 is a block diagram illustrating an example electronic device 401 according to various example embodiments. The electronic device 401 may include, for example, the entirety or a part of the electronic device 101 illustrated in FIG. 1 and/or the electronic device 201 illustrated in FIG. 2. The electronic device 401 may include at least one Application Processor (AP) (e.g., including processing circuitry) 410, a communication module (e.g., including communication circuitry) 420, a subscriber identification module 424, a memory 430, a sensor module 440, an input device (e.g., including input circuitry) 450, a display 460, an interface (e.g., including interface circuitry) 470, an audio module 480, a camera module 491, a power management module 495, a battery 496, an indicator 497, and a motor 498.

The processor 410 may drive, for example, an operating system or application programs to control a plurality of hardware or software elements connected thereto and may perform various types of data processing and operations. The processor 410 may include various processing circuitry, such as, for example, and without limitation, a dedicated processor, an application processor, a CPU, or the like, and may be realized as a System on Chip (SoC). According to an embodiment, the processor 410 may further include a Graphic Processing Unit (GPU) and/or an image signal processor. The processor 410 may also include at least some (for example, a cellular module 421) of the elements illustrated in FIG. 4. The processor 410 may load, in a volatile memory, instructions or data received from at least one of the other elements (for example, a non-volatile memory) to process the loaded instructions or data, and may store various types of data in the non-volatile memory.

The communication module 420 may have a configuration equal or similar to that of the communication interface 170 of FIG. 1. The communication module 420 may include various communication circuitry, such as, for example, and without limitation, a cellular module 421, a Wi-Fi module 423, a BT module 425, a GNSS module 427 (for example, a GPS module, a Glonass module, a Beidou module, or a Galileo module), an NFC module 428, and a Radio Frequency (RF) module 429.

The cellular module 421 may provide, for example, a voice call, a video call, a text message service, an Internet service, etc. through a communication network. According to an embodiment of the present disclosure, the cellular module 421 may identify or authenticate an electronic device 401 in the communication network by using the subscriber identification module (for example, a Subscriber Identity Module (SIM) card) 424. According to an embodiment, the cellular module 421 may perform at least some of the functions that the AP 410 may provide. According to an embodiment, the cellular module 421 may include a Communication Processor (CP).

The Wi-Fi module 423, the BT module 425, the GNSS module 427, or the NFC module 428 may include, for example, a processor for processing data that is transmitted and received through the corresponding module. In some embodiments, at least some (two or more) of the cellular module 421, the Wi-Fi module 423, the Bluetooth module 425, the GNSS module 427, and the NFC module 428 may be included in a single Integrated Chip (IC) or IC package.

The RF module 429, for example, may transmit/receive a communication signal (for example, an RF signal). The RF module 429 may include, for example, a transceiver, a Power Amplifier Module (PAM), a frequency filter, a Low Noise Amplifier (LNA), an antenna, etc. According to another embodiment, at least one of the cellular module 421, the Wi-Fi module 423, the Bluetooth module 425, the GNSS module 427, and the NFC module 428 may transmit/receive an RF signal through a separate RF module.

The subscriber identification module 424 may include, for example, a card that includes a subscriber identification module and/or an embedded SIM, and may contain unique identification information (e.g., an Integrated Circuit Card Identifier (ICCID)) or subscriber information (e.g., an International Mobile Subscriber Identity (IMSI)).

The memory 430 (for example, the memory 130) may include, for example, an internal memory 432 and/or an external memory 434. The internal memory 23A may include at least one of, for example, a volatile memory (e.g., a Dynamic Random Access Memory (DRAM), a Static RAM (SRAM), a Synchronous Dynamic RAM (SDRAM), etc.) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), etc.).

The external memory 434 may further include a flash drive, for example, a Compact Flash (CF), a Secure Digital (SD), a Micro-Secure Digital (Micro-SD), a Mini-Secure Digital (Mini-SD), an extreme Digital (xD), a Multi-Media Card (MMC), a memory stick, or the like. The external memory 434 may be functionally and/or physically connected to the electronic device 401 through various interfaces.

The sensor module 440 may, for example, measure a physical quantity or detect the operating state of the electronic device 201 and may convert the measured or detected information into an electrical signal. The sensor module 440 may include the sensor module 190 illustrated in FIG. 1. The sensor module 440 may include, for example, at least one of a gesture sensor 440A, a gyro sensor 440B, an atmospheric pressure sensor 440C, a magnetic sensor 440D, an acceleration sensor 440E, a grip sensor 440F, a proximity sensor 440G; a color sensor 440H (e.g., a Red, Green, and Blue (RGB) sensor), a biometric sensor 440I, a temperature/humidity sensor 440J, an illumination sensor 440K, and a ultraviolet (UV) sensor 440M. Additionally or alternatively, the sensor module 440 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 440 may further include a control circuit for controlling one or more sensors included therein. In some embodiments, the electronic device 401 may further include a processor, which is configured to control the sensor module 440, as a part of the processor 410 or separately from the processor 410 in order to control the sensor module 440 while the processor 410 is in a sleep state.

The input device 450 may include the auxiliary input device 180 illustrated in FIG. 1

The input device 450 may include various input circuitry, such as, for example, and without limitation, a touch panel 452, a (digital) pen sensor 454, a key 456, or an ultrasonic input unit 458. The touch panel 452 may use, for example, at least one of a capacitive type, a resistive type, an infrared type, and an ultrasonic type. Furthermore, the touch panel 452 may further include a control circuit. The touch panel 452 may further include a tactile layer to provide a tactile reaction to a user.

The (digital) pen sensor 454 may include, for example, a recognition sheet that is a part of, or separate from, the touch panel. The key 456 may include, for example, a physical button, an optical key, or a keypad. The ultrasonic input device 458 may detect ultrasonic waves, which are generated by an input tool, through a microphone (for example, a microphone 488) to identify data corresponding to the detected ultrasonic waves.

The display 460 (for example, the display 160) may include a panel 462, a hologram device 464 or a projector 466. The panel 462 may have a configuration that is the same as, or similar to, that of the display 160 illustrated in FIG. 1. The panel 462 may be implemented to be, for example, flexible, transparent, or wearable. The panel 462, together with the touch panel 452, may be implemented as one module. The hologram device 464 may show a three dimensional image in the air by using an interference of light. The projector 466 may display an image by projecting light onto a screen. The screen may be located, for example, in the interior of, or on the exterior of, the electronic device 401. According to an embodiment, the display 460 may further include a control circuit for controlling the panel 462, the hologram device 464, or the projector 466.

The interface 470 may include various interface circuitry, such as, for example, and without limitation, a High-Definition Multimedia Interface (HDMI) 472, a Universal Serial Bus (USB) 474, an optical interface 476, or a D-subminiature (D-sub) 478. The interface 470 may be included, for example, in the communication interface 170 illustrated in FIG. 1. Additionally or alternatively, the interface 470 may include, for example, a Mobile High-definition Link (MHL) interface, a Secure Digital (SD) card/Multi-Media Card (MMC) interface, or an Infrared Data Association (IrDA) standard interface.

The audio module 480 may convert, for example, a sound into an electrical signal, and vice versa. At least some elements of the audio module 480 may be included, for example, in the input/output interface 145 illustrated in FIG. 1. The audio module 480 may process sound information that is input or output through, for example, a speaker 482, a receiver 484, earphones 486, the microphone 488, etc.

The camera module 491 is, for example, a device which may photograph a still image and a video. According to an embodiment of the present disclosure, the camera module 291 may include one or more image sensors (e.g., a front sensor or a back sensor), a lens, an Image Signal Processor (ISP) or a flash (e.g., LED or xenon lamp).

The power management module 495 may manage, for example, the power of the electronic device 401. According to an embodiment, the power management module 495 may include a Power Management Integrated Circuit (PMIC), a charger Integrated Circuit (IC), or a battery or fuel gauge. The PMIC may use a wired and/or wireless charging method. Examples of the wireless charging method may include a magnetic resonance method, a magnetic induction method, an electromagnetic wave method, etc. Additional circuits (for example, a coil loop, a resonance circuit, a rectifier, etc.) for wireless charging may be further included. The battery gauge may measure, for example, the residual amount of the battery 496 and a voltage, current, or temperature while charging. The battery 496 may include, for example, a rechargeable battery and/or a solar battery.

The indicator 497 may indicate a particular state (for example, a booting state, a message state, a charging state, and the like) of the electronic device 401 or a part (for example, the processor 410) thereof. The motor 498 may convert an electrical signal into a mechanical vibration and may generate a vibration, a haptic effect, etc. Although not illustrated, the electronic device 401 may include a processing unit (for example, a GPU) for supporting mobile TV. The processing unit for supporting the mobile TV may process media data according to a standard, such as Digital Multimedia Broadcasting (DMB), Digital Video Broadcasting (DVB), MediaFlo™, and the like.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 5:
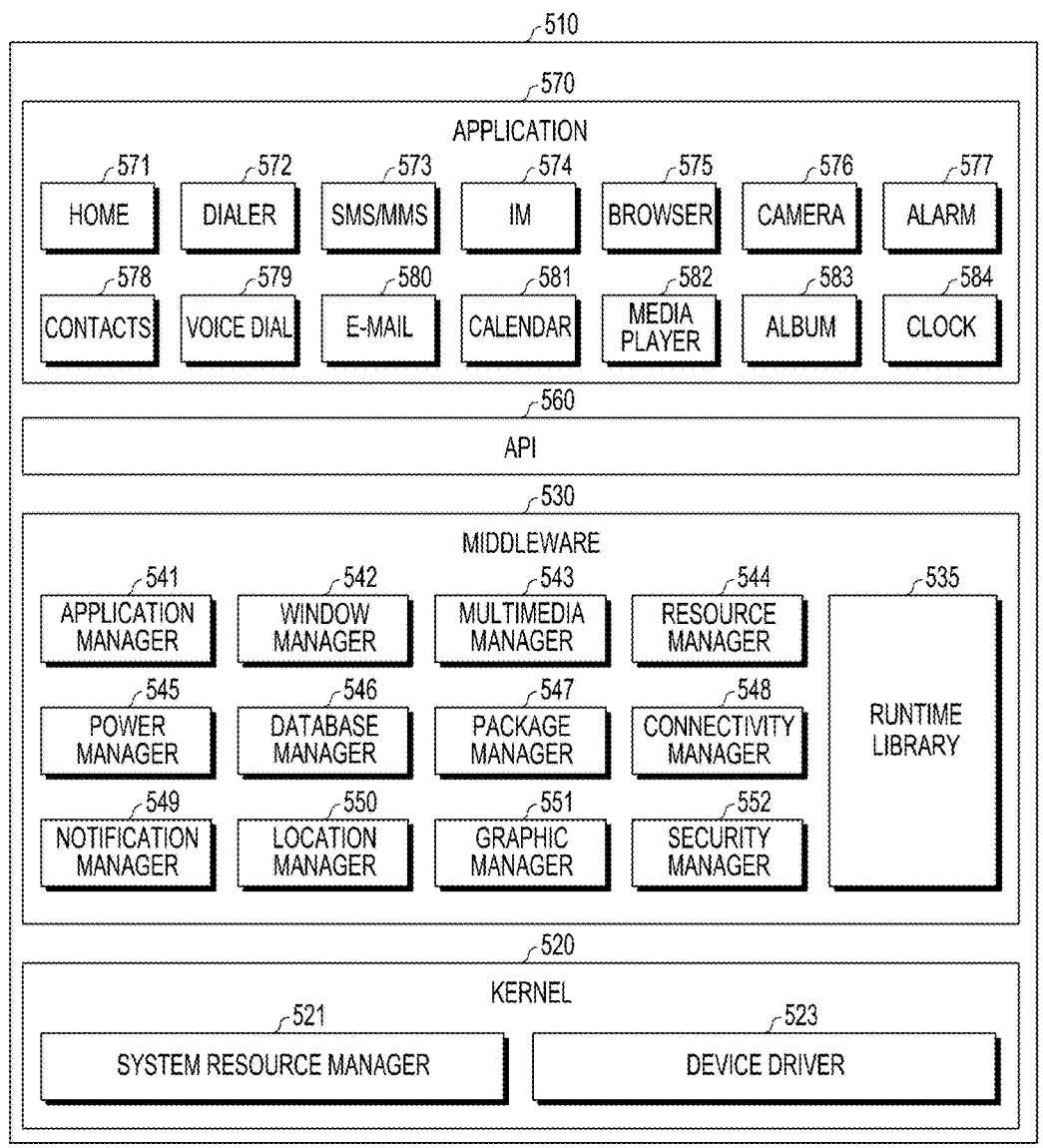
FIG. 5 is a block diagram illustrating an example program module according to various example embodiments.

FIG. 5 is a block diagram illustrating an example program module according to various example embodiments. According to an embodiment, the program module 510 (for example, the program 140) may include an Operating System (OS) that controls resources relating to an electronic device (for example, the electronic device 101) and/or various applications (for example, the application programs 147) that are executed in the operating system. The operating system may be, for example, Android, iOS, Windows, Symbian, Tizen, Bada, and the like The program module 510 may include a kernel 520, middleware 530, an Application Programming Interface (API) 560, and/or applications 570. At least a part of the program module 510 may be preloaded on the electronic device, or may be downloaded from an external electronic device (for example, the electronic device 102 or 104 or the server 106).

The kernel 520 (for example, the kernel 141) may include, for example, a system resource manager 521 and/or a device driver 523. The system resource manager 521 may control, allocate, or retrieve system resources. According to an embodiment, the system resource manager 521 may include a process management unit, a memory management unit, or a file system management unit. The device driver 523 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 530 may provide a function required by the applications 1470 in common or provide various functions to the applications 570 through the API 570 so that the applications 560 can efficiently use limited system resources within the electronic device. According to an embodiment, the middleware 530 (for example, the middleware 143) may include, for example, at least one of a runtime library 535, an application manager 541, a window manager 542, a multimedia manager 543, a resource manager 544, a power manager 545, a database manager 546, a package manager 547, a connectivity manager 548, a notification manager 549, a location manager 550, a graphic manager 551, and a security manager 552.

The runtime library 535 may include, for example, a library module that a compiler uses in order to add a new function through a programming language while the applications 570 are being executed. The runtime library 535 may perform input/output management, memory management, the functionality for an arithmetic function, and the like.

The application manager 541 may manage, for example, the life cycle of at least one of the applications 570. The window manager 542 may manage Graphical User Interface (GUI) resources used on a screen. The multimedia manager 543 may determine formats required to reproduce various media files and may encode or decode a media file using a coder/decoder (codec) appropriate for the corresponding format. The resource manager 544 may manage resources, such as the source code, the memory, the storage space, and the like of at least one of the applications 570.

The power manager 545 may operate together with, for example, a Basic Input/Output System (BIOS) to manage a battery or power and provide power information required for the operation of the electronic device. The database manager 546 may generate, search for, and/or change a database to be used by at least one of the applications 570. The package manager 547 may manage the installation or update of an application that is distributed in the form of a package file.

The connectivity manager 548 may manage a wireless connection, such as Wi-Fi, Bluetooth, and the like. The notification manager 549 may display or notify of an event, such as an arrival message, an appointment, a proximity notification, etc., in such a manner as not to disturb a user. The location manager 550 may manage the location information of the electronic device. The graphic manager 551 may manage a graphic effect to be provided to a user and a user interface relating to the graphic effect. The security manager 552 may provide various security functions required for system security, user authentication, etc. According to an embodiment, when the electronic device (for example, the electronic device 101) has a telephone call function, the middleware 530 may further include a telephony manager that manages a voice or video call function of the electronic device.

The middleware 530 may include a middleware module that forms a combination of various functions of the above-described elements. The middleware 530 may provide specialized modules according to the types of operating systems in order to provide differentiated functions. Furthermore, the middleware 530 may dynamically remove some of the existing elements, or may add new elements.

The API 560 (for example, the API 145) is, for example, a set of API programming functions, and may be provided with different configurations according to operating systems. For example, in the case of Android or iOS, one API set may be provided for each platform, and in the case of Tizen, two or more API sets may be provided for each platform.

The applications 570 (for example, the application programs 147) may include one or more applications that can perform functions, for example, home 571, dialer 572, SMS/MMS 573, Instant Message (IM) 574, browser 575, camera 576, alarm 577, contacts 578, voice dial 579, e-mail 580, calendar 581, media player 582, album 583, clock 584, health care (for example, measuring exercise quantity or blood sugar), and environment information (for example, atmospheric pressure, humidity, temperature information, and the like).

According to an embodiment, the applications 570 may include an application (hereinafter, referred to as an "information exchange application" for convenience of description) that supports information exchange between the electronic device (for example, the electronic device 101) and an external electronic device (for example, the electronic device 102 or 104). The information exchange application may include, for example, a notification relay application for transferring specific information to an external electronic device or a device management application for managing an external electronic device.

For example, the notification relay application may include a function of delivering, to the external electronic device (for example, the electronic device 102 or 104), notification information generated by other applications (for example, an SMS/MMS application, an email application, a health care application, an environmental information application, and the like) of the electronic device 101. Furthermore, the notification relay application may, for example, receive notification information from the external electronic device and may provide the received notification information to a user.

The device management application may manage (for example, install, delete, or update), for example, at least one function of an external electronic device (for example, the electronic device 102 or 104) that communicates with the electronic device (for example, a function of turning on/off the external electronic device itself (or some components thereof) or a function of adjusting the brightness (or resolution) of a display), applications that operate in the external electronic device, or services (for example, a call service, a message service, and the like) that are provided by the external electronic device.

According to an embodiment, the applications 570 may include applications (for example, a health care application of a mobile medical appliance, and the like) designated according to the attributes of an external electronic device (for example—the electronic device 102 or 104). According to an embodiment, the applications 570 may include applications received from an external electronic device (for example, the server 106 or the electronic device 102 or 104). According to an embodiment, the applications 570 may include a preloaded application or a third party application that may be downloaded from a server. The names of the elements of the program module 510, according to the embodiment illustrated in the drawing, may vary according to the type of operating system.

According to various embodiments, at least a part of the programming module 510 may be implemented in software, firmware, hardware, or a combination of two or more thereof. At least some of the program module 510 may be implemented (e.g., executed) by, for example, the processor (e.g., the processor 1410). At least some of the program module 510 may include, for example, a module, a program, a routine, a set of instructions, and/or a process for performing one or more functions.

Figure 6:
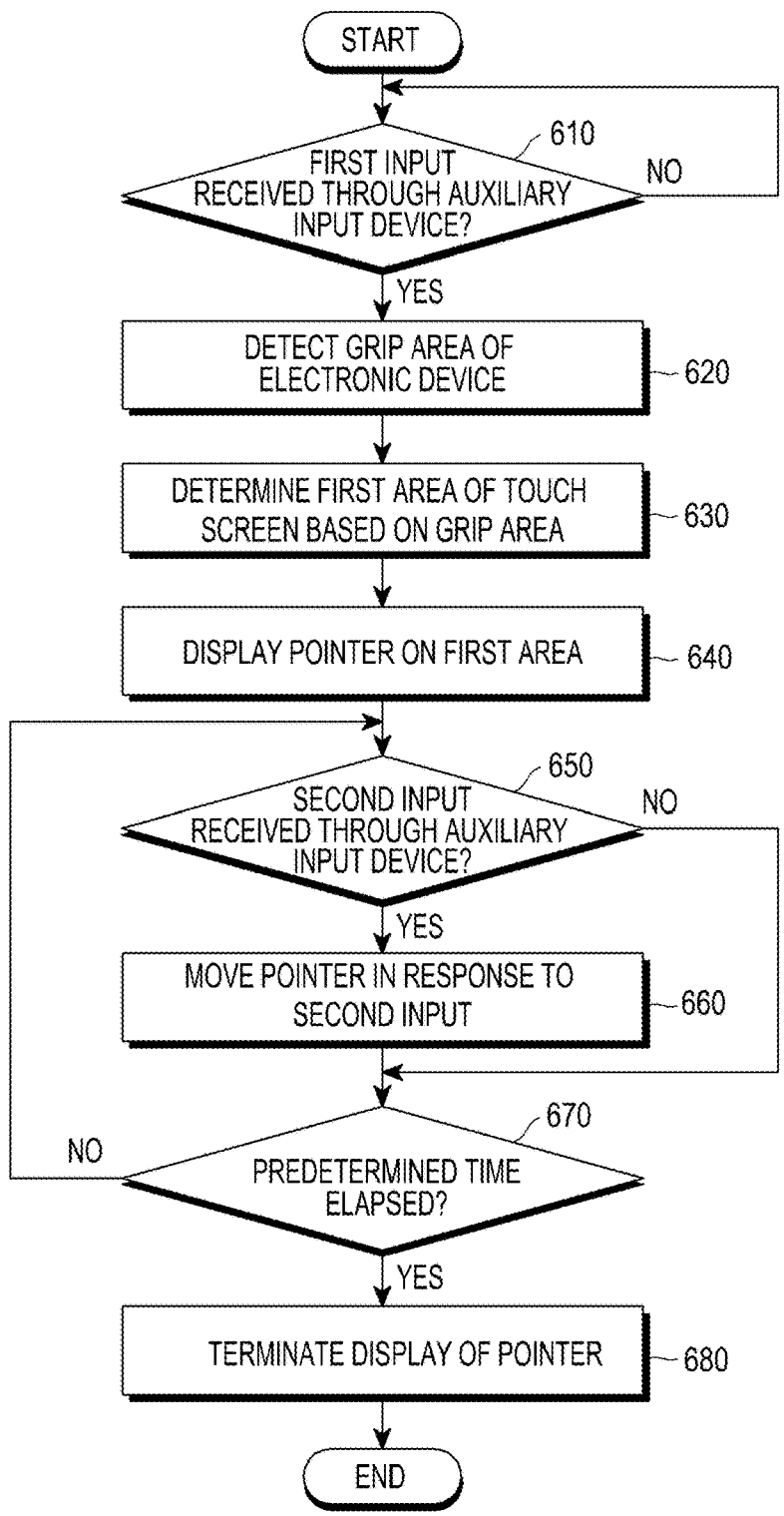
FIG. 6 is a flowchart illustrating an example control operation of an electronic device according to various example embodiments.

FIG. 6 is a flowchart illustrating an example control operation of an electronic device (for example, the electronic device 101) according to various example embodiments and FIGS. 7A, 7B, 7C and 7D illustrate example control of an electronic device (for example, the electronic device 101) according to various example embodiments. Referring to FIG. 6 and FIG. 7A-7D, when a user operates an electronic device using one hand, the user may generate a pointer on an area of the front part of the electronic device, which cannot be reached by the hand, through an auxiliary input device of the electronic device. In addition, the user may operate the auxiliary input device to control the area which cannot be reached by the hand through the pointer.

In operation 610, the electronic device may determine whether a first input is received through an auxiliary input device (for example, the auxiliary input device 180). In operation 610, when the electronic device determines that the first input is received through the auxiliary input device, the electronic device may execute operation 620. Otherwise, the electronic device may re-execute operation 610.

As illustrated in FIG. 7A, in a state where a user grips an electronic device using one hand, the user may perform a first input with respect to an auxiliary input device (for example, the auxiliary input device 180) placed on the back surface of the electronic device.

The first input, for example, may be an input for generating a first movement amount with respect to the auxiliary input device. For example, when the auxiliary input device corresponds to a multi-function stick switch, the user may incline a stick of the multi-function stick switch in a predetermined direction or in any direction to generate a first movement amount with respect to the multi-function stick switch. For example, when the auxiliary input device corresponds to a trackpad, the user may execute, on the trackpad, an input similar to a flick (flick: a gesture of quickly moving a finger on a screen and removing it) gesture on a touch screen so as to generate a first movement amount with respect to the trackpad. For example, when the auxiliary input device corresponds to a trackball, the user may move the trackball using his/her finger to generate a first movement amount with respect to the trackball.

Otherwise, the first input, for example, may be an input for generating a push input with respect to the auxiliary input device.

In operation 620, the electronic device may detect a grip area of the electronic device. For example, when a first input is received through the auxiliary input device, the electronic device may detect a grip area of the electronic device by a user's hand. The electronic device may execute the detection of the grip area using a sensor module (for example, the sensor module 190) which is mounted in the electronic device.

In operation 630, the electronic device may determine a first area of the touch screen based on the grip area. The first area may be an area predetermined within a display (for example, the display 160) of the electronic device, according to the grip area. For example, when assuming that one hand which grips the electronic device (a finger of one hand which grips the electronic device) touches a touch screen placed on the front surface of the electronic device, a first area may be an area which is determined as a non-touchable area on the touch screen.

Figure 8A:
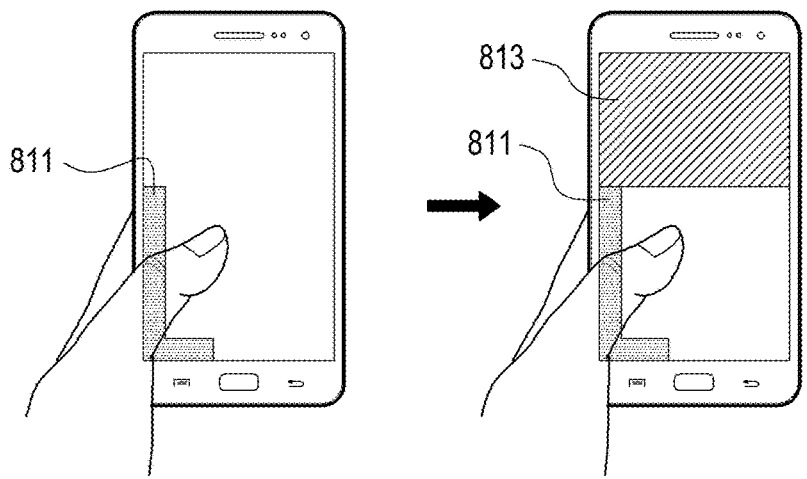
FIGS. 8A and 8B are diagrams illustrating example determination of a non-touchable area of a touch screen when an electronic device is operated using one hand, according to various example embodiments.
Figure 8B:
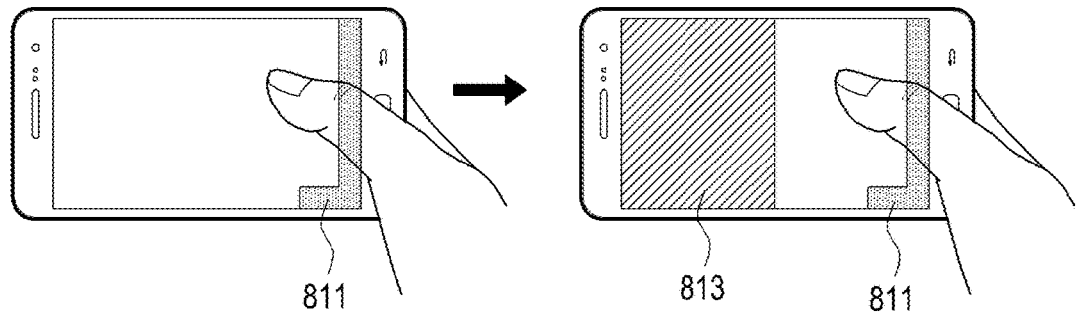

The first area may be determined by experiment as illustrated in FIGS. 8A and 8B.

Referring to FIG. 8A, when a user touches a touch screen of an electronic device using a finger of the hand which grips the electronic device in a state where the user grips the electronic device (for example, the electronic device 101) in a vertical direction, a non-touchable area 813 of the touch screen may be identified.

In addition, referring to FIG. 8B, when a user touches a touch screen of an electronic device using a finger of the hand which grips the electronic device in a state where the user grips the electronic device in a horizontal direction, a non-touchable area 813 of the touch screen may be identified.

As illustrated in FIGS. 8A and 8B, through experiments in which the user operates the electronic device using one hand which grips the electronic device (a finger of the hand which grips the electronic device), a non-touchable area 813 on a touch screen of the front surface of the electronic device, according to the detected grip area 811 of the electronic device, may be designated as a first area based on the grip area 811.

In operation 640, the electronic device may display a pointer on the first area. For example, when a user grips a left lower end portion of the electronic device as illustrated in FIG. 7B, the electronic device may designate an upper end portion of the electronic device as a first area based on a grip area, and may generate a pointer 705 at the center of the first area of the electronic device as illustrated in FIG. 7B.

In operation 650, the electronic device may determine whether a second input is received through the auxiliary input device. In operation 650, when the electronic device determines that the second input is received through the auxiliary input device, the electronic device may execute operation 660. Otherwise, the electronic device may execute operation 670.

In operation 660, the electronic device may move the pointer in response to the second input.

As illustrated in FIG. 7C, in a state where a user grips the electronic device using one hand, the user may perform a second input with respect to the auxiliary input device placed on the back surface of the electronic device. In addition, referring to FIG. 7D, the pointer 705 displayed on the touch screen may move and be displayed according to the second input.

The second input, for example, may be an input for operating an auxiliary input device to generate a second movement amount with respect to the auxiliary input device. For example, when the auxiliary input device corresponds to a multi-function stick switch, a user may incline a stick of the multi-function stick switch in a direction corresponding to the direction in which the user wants to move a pointer to generate a second movement amount with respect to the multi-function stick switch. For example, when the auxiliary input device corresponds to a trackpad, a user may execute, on the trackpad, an input similar to a flick gesture on the touch screen in a direction corresponding to the direction in which the user wants to move a pointer to generate a second movement amount with respect to the trackpad. For example, when the auxiliary input device corresponds to a trackball, a user may move the trackball using his/her finger to generate a second movement amount with respect to the trackball.

In operation 670, the electronic device may determine whether a predetermined time has elapsed. In operation 670, when the electronic device determines that the predetermined time has elapsed, the electronic device may execute operation 680. Otherwise, the electronic device may re-execute operation 650.

In operation 680, the electronic device may terminate the display of the pointer.

Figure 9A:
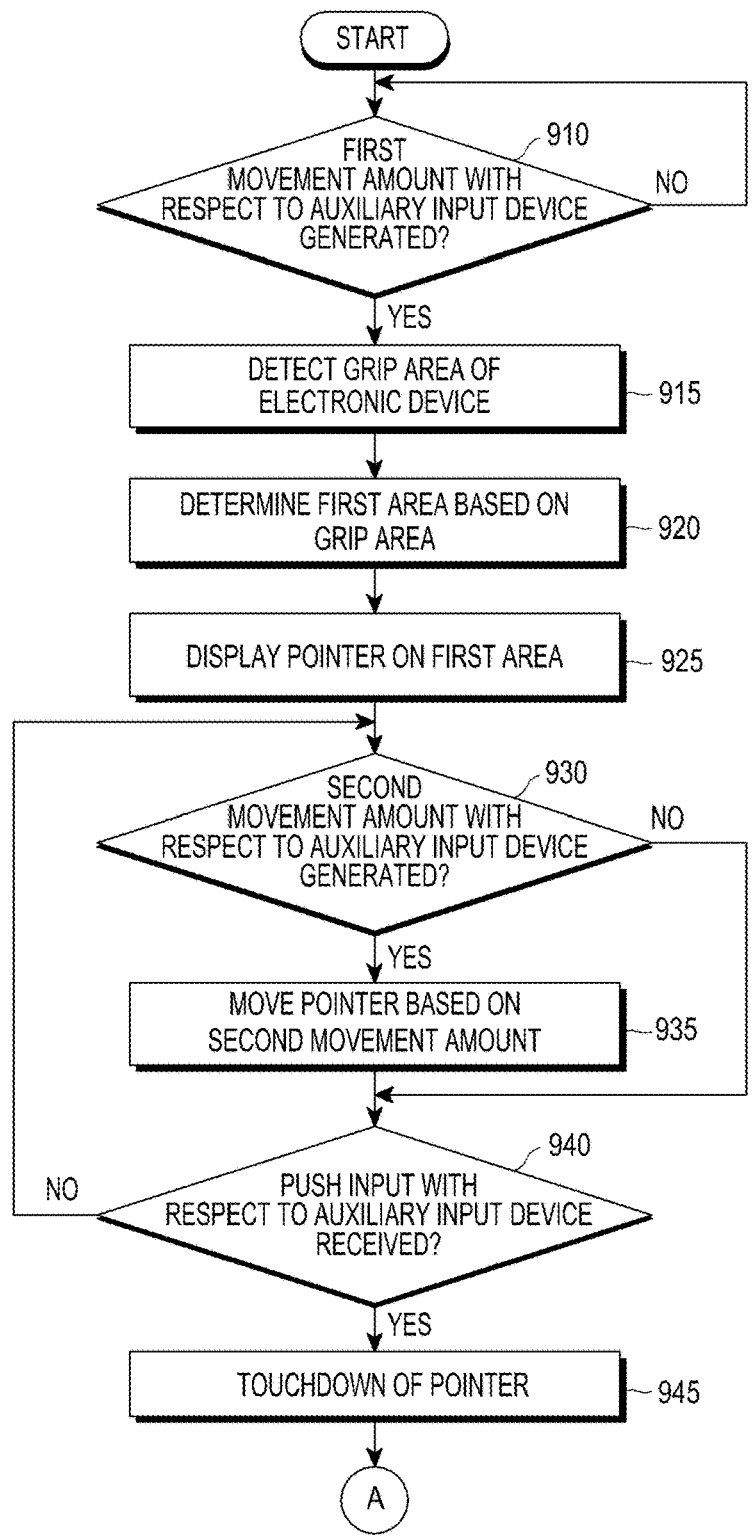
FIG. 9A and FIG. 9B is a flowchart illustrating an example control operation of an electronic device according to various example embodiments.
Figure 9B:
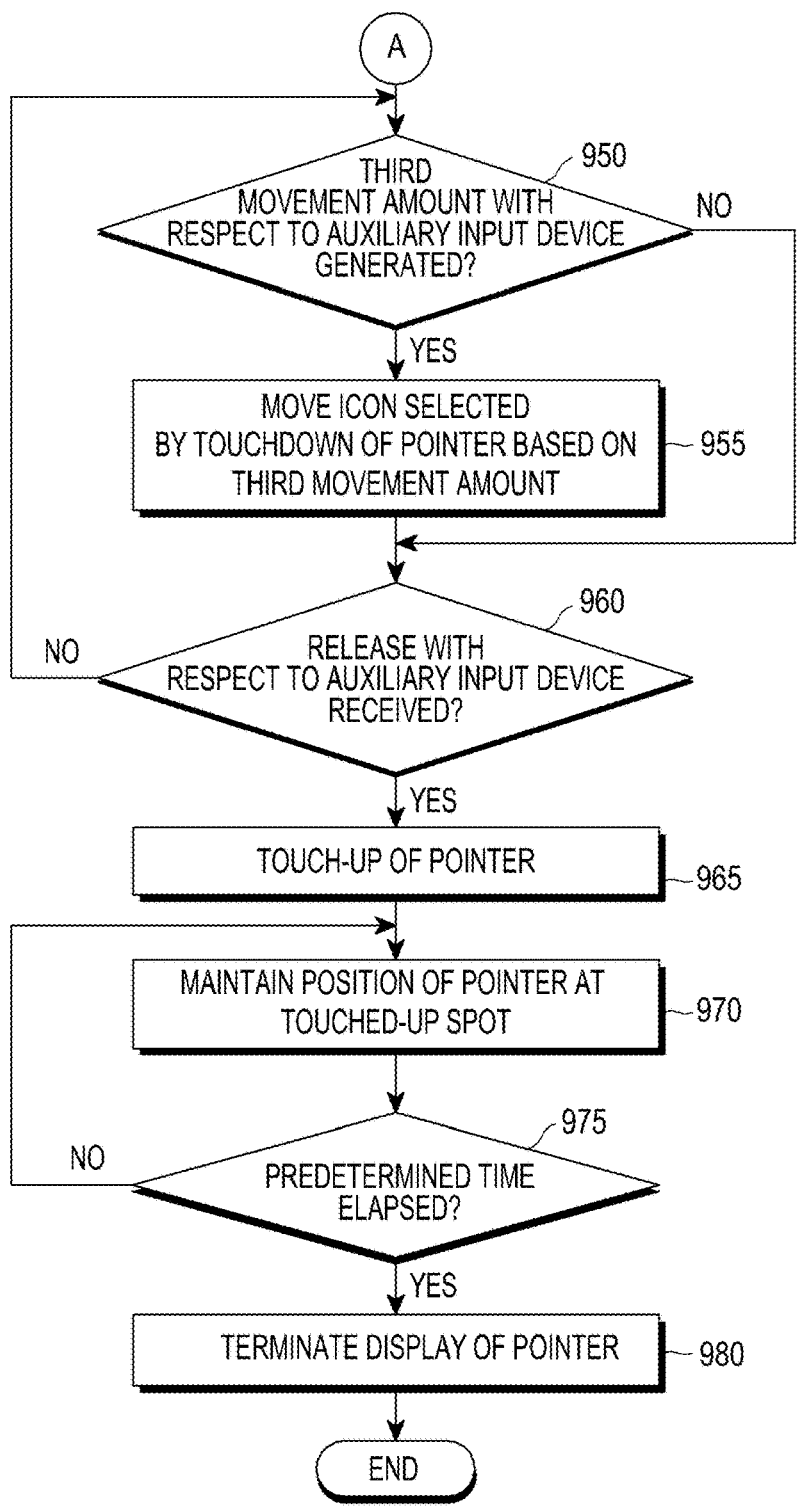

FIGS. 9A and 9B is a flowchart illustrating an example control operation of an electronic device (for example, the electronic device 101) according to various example embodiments, and FIGS. 10A, 10B, 10C, 10D, 10E, 10F, 10G and 10H illustrate example control of an electronic device (for example, the electronic device 101) according to various example embodiments.

In operation 910, the electronic device may determine whether a first movement amount with respect to an auxiliary input device (for example, the auxiliary input device 180) is generated. In operation 910, when the electronic device determines that the first movement amount with respect to the auxiliary input device is generated, the electronic device may execute operation 915. Otherwise, the electronic device may re-execute operation 910.

Referring to FIG. 10A, in a state where a user grips the electronic device, the user may operate an input device to generate a first movement amount with respect to the auxiliary input device placed on the back surface of the electronic device.

In operation 915, the electronic device may detect a grip area of the electronic device.

For example, when the electronic device receives a first input through the auxiliary input device, a grip area 1001 of the electronic device which is gripped by a user's hand may be detected as illustrated in FIG. 10B, using a sensor module (for example, the sensor module 190) mounted in the electronic device.

In operation 920, the electronic device may determine a first area based on the grip area.

When a user touches a touch screen placed on the front surface of the electronic device using one hand which grips the electronic device (a finger of one hand which grips the electronic device), a first area 1003 may be an area which is predetermined according to the grip area as a non-touchable area on the touch screen. Referring to FIGS. 10B and 10C, when a grip area of reference numeral 1001 part is detected, the electronic device may determine an area of reference numeral 1003 part which is predetermined with respect to the grip area of reference numeral 1001 part as a first area.

In operation 925, the electronic device may display a pointer on the first area.

Referring to FIG. 10C, the electronic device may generate a pointer 1005 at the center coordinate of the first area 1003. In comparison with the case where the pointer 1005 is generated at the center of the first area 1003 and the case where a pointer is generated at the center of the touch screen, the pointer 1005 generated at the center of the first area 1003 may be used to more quickly execute a specific function (e.g., an icon) within the first area 1003 compared with the pointer generated at the center of the touch screen.

In operation 930, the electronic device may determine whether a second movement amount with respect to the auxiliary input device is generated. In operation 930, when the electronic device determines that the second movement amount with respect to the auxiliary input device is generated, the electronic device may execute operation 935. Otherwise, the electronic device may execute operation 940.

In operation 935, the electronic device may move the pointer based on the second movement amount.

In relation to the operation of the auxiliary input device to generate the first movement amount, a user may continuously operate the auxiliary input device so that a second movement amount is generated, as illustrated in FIG. 10D. The pointer 1005 may move in response to the operation of the auxiliary input device as illustrated in FIG. 10E (in accordance with the second movement amount).

In operation 940, the electronic device may determine whether a push input with respect to the auxiliary input device is received. In operation 940, when the electronic device determines that the push input with respect to the auxiliary input device is received, the electronic device may execute operation 945. Otherwise, the electronic device may re-execute operation 930.

In operation 945, the electronic device may execute a touchdown function of the pointer. The touchdown function of the pointer may be the same as a click function of a typical mouse. For example, the touchdown function of the pointer may include a function of selecting an icon at a spot where the pointer is located or a function of executing a specific item at a spot where the pointer is located. The touchdown function of the pointer, for example, when the auxiliary input device corresponds to a touch screen, may be executed according to a gesture in which the user touches the touch screen and then maintains the touch. The touchdown function of the pointer, for example, when the auxiliary input device corresponds to a trackball, may be executed according to a gesture in which the user pushes the trackball and then maintains the push.

Referring to FIG. 10F, a user may execute a push input on the auxiliary input device, and an icon at a spot where the pointer is located may be selected according to the user's operation. For example, when the auxiliary input device corresponds to a trackball, the user pushes the trackball so that an icon at a spot where the pointer is located may be selected.

In operation 950, the electronic device may determine whether a third movement amount with respect to the auxiliary input device is generated. In operation 950, when the electronic device determines that the third movement amount with respect to the auxiliary input device is generated, the electronic device may execute operation 955. Otherwise, the electronic device may execute operation 960.

In operation 955, the electronic device may move an icon selected by a touchdown of the pointer based on the third movement amount. The pointer may move with the icon based on the third movement amount. For example, a user may operate an input device to generate a third movement amount while maintaining the push input with respect to the auxiliary input device. For example, when the auxiliary input device correspond s to a trackball, a user may move the ball while pushing the ball to generate a third movement amount with respect to the ball, and at this time, an icon selected by the push input may move in accordance with the movement of the ball.

In operation 960, the electronic device may determine whether a release with respect to the auxiliary input device is received. In operation 960, when the electronic device determines that the release with respect to the auxiliary input device is received, the electronic device may execute operation 965. Otherwise, the electronic device may re-execute operation 950.

In operation 965, the electronic device may execute a touch-up function of the pointer. The touch-up function of the pointer, for example, may include a function of releasing the selection of a specific icon selected by the push input. The touch-up function of the pointer, for example, when the auxiliary input device corresponds to a touch screen, may be executed according to a gesture in which a user lifts a finger up in a state in which the user touches the touch screen. The touch-up function of the pointer, for example, when the auxiliary input device corresponds to a trackball, may be executed according to a gesture in which a user releases a pushed trackball.

In operation 970, the electronic device may maintain the position of the pointer at the touched-up spot.

For example, when a user who operates the auxiliary input device to generate the third movement amount executes a release operation with respect to the auxiliary input device, the movement of the icon may be stopped with the release of the selection of the icon moved based on the third movement amount, and the movement of the pointer moved based on the third movement amount may also be stopped. For example, when a user releases the trackball after the third movement amount with respect to the trackball is generated, as illustrated in FIG. 10G; the selection of the selected and moved icon may be released, the movement of the icon may be stopped, and the movement of the pointer may also be stopped.

In operation 975, the electronic device may determine whether a predetermined time has elapsed. In operation 975, when the electronic device determines that the predetermined time has elapsed, the electronic device may execute operation 980. Otherwise, the electronic device may re-execute operation 970.

In operation 980, the electronic device may terminate the display of the pointer.

For example, when there is no user's operation with respect to the auxiliary input device during a predetermined time, the electronic device may terminate the display of the pointer, as illustrated in FIG. 10H.

According to various embodiments, a method for controlling an electronic device may include the operations of: detecting a grip area with respect to the electronic device; when a first input is received through an auxiliary input device placed on a second surface of the electronic device, determining a first area of a touch screen which is positioned on a first surface of the electronic device, on the basis of the grip area; and displaying a pointer on the first area.

According to various embodiments, a grip area with respect to the electronic device may be detected using a plurality of touch sensors, a plurality of pressure-sensitive sensors, or a plurality of proximity sensors of the electronic device.

According to various embodiments, an operation of displaying a pointer on the first area may include an operation of displaying the pointer at the center of the first area.

Various embodiments may further include an operation of terminating the display of the pointer when an input is not received through the auxiliary input device during a predetermined time after displaying the pointer.

According to various embodiments, the auxiliary input device may include a multi-function stick switch, a touch screen, a trackpad, or a trackball.

Various embodiments may further include an operation of displaying a movement of the pointer on the touch screen in response to a second input when the second input is received through the auxiliary input device.

Various embodiments may further include an operation of selecting an icon by the pointer when an input for selecting the icon at a position of the pointer is received through the auxiliary input device.

Various embodiments may further include an operation of displaying the dragging of the selected icon in response to a drag input when the drag input with respect to the selected icon is received through the auxiliary input device.

FIGS. 11A, 11B, 12A, 12B and 13 are diagrams illustrating example utilization of an auxiliary input device of an electronic device (for example, the electronic device 101) according to various example embodiments.

Referring to FIG. 11, an auxiliary input device 1180 of the electronic device may be used to control image reproduction by a media player.

Accordingly, when reproducing an image by the media player, the auxiliary input device 1180 may be used to simply and conveniently control a screen displayed on the electronic device without interfering with the screen.

Figure 11A:
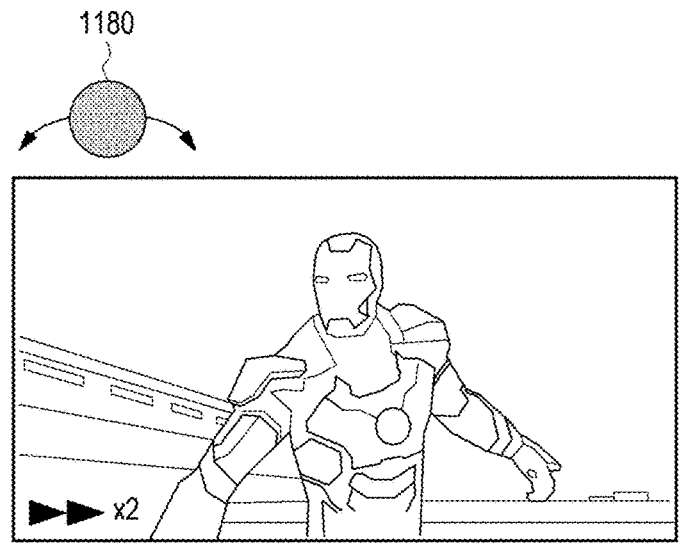
FIGS. 11A, 11B, 12A, 12B and 13 are diagrams illustrating example utilization of an auxiliary input device of an electronic device according to various example embodiments.

Referring to FIG. 11A, a user may move the auxiliary input device 1180 to the left or right to execute a fast forward or rewind function for the image reproduced in the media player. For example, when the auxiliary input device 1180 corresponds to a trackball, if the user moves the trackball to the left using his/her finger, the fast forward function may be executed, and if the user moves the trackball to the right using the finger, the rewind function may be executed.

Figure 11B:
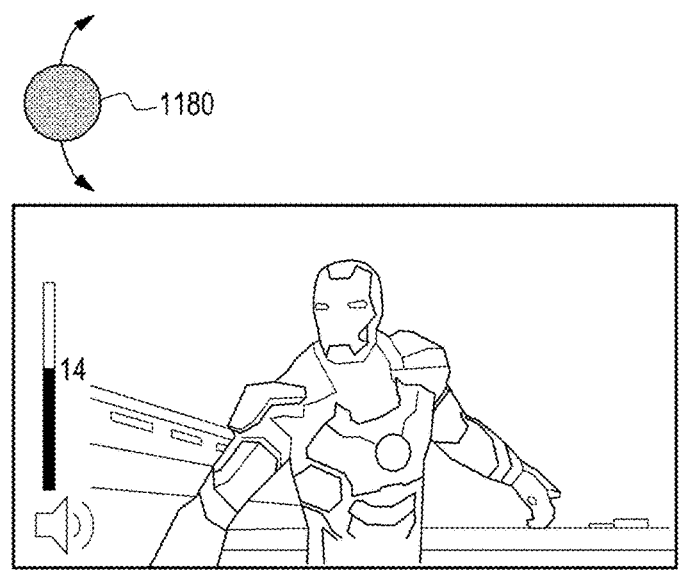

Referring to FIG. 11B, a user may move the auxiliary input device 1180 upward or downward to adjust the volume of the media player. For example, when the auxiliary input device 1180 corresponds to a trackball, if the user moves the trackball upward using his/her finger, the volume may increase, and if the user moves the trackball downward using the finger, the volume may decrease.

Figure 12A:
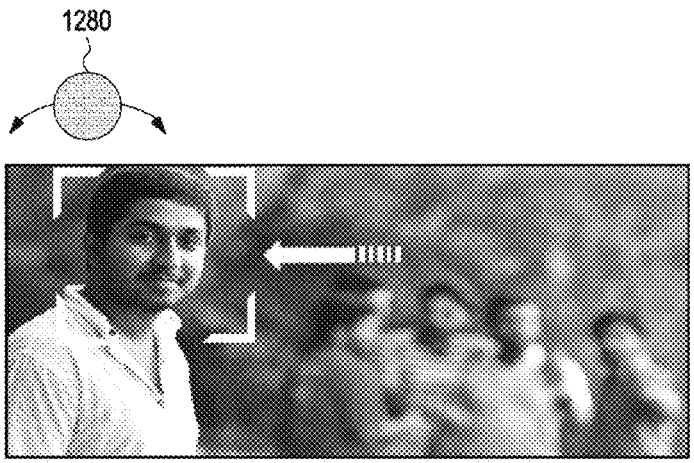
Figure 12B:
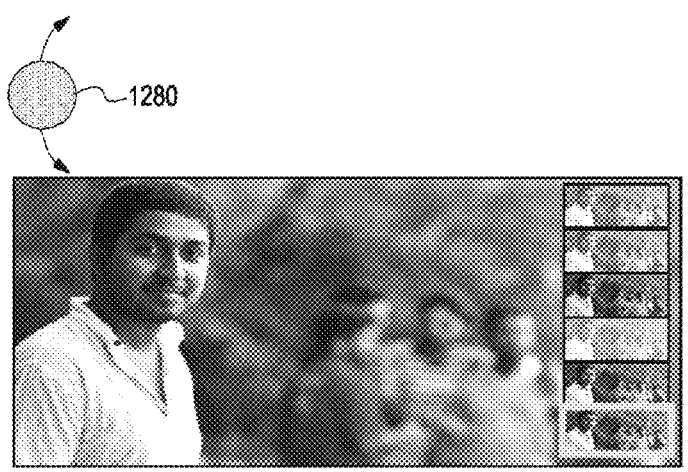

Referring to FIGS. 12A and 12B, an auxiliary input device 1280 of the electronic device may be used to quickly execute a specific function of a camera. For example, the auxiliary input device 1280 may be used to quickly configure a screen of the camera.

Referring to FIG. 12A, a user may move the auxiliary input device 1280 to the left or right to move a position of a focus of the camera to correspond to the movement of the auxiliary input device 1280. For example, when the auxiliary input device 1280 corresponds to a trackball, if the user moves the trackball to the left using his/her finger, the position of the focus of the camera may move to the left in accordance with the movement of the trackball. In addition, if the user moves the trackball to the right using the finger, the position of the focus of the camera may move to the right in accordance with the movement of the trackball.

Referring to FIG. 12B, a user may move the auxiliary input device 1280 upward or downward to select and apply one of filters of the camera which are displayed on a screen. For example, when the auxiliary input device 1280 corresponds to a trackball, the user may move the ball upward or downward using his/her finger to select a desired filter.

Figure 13:
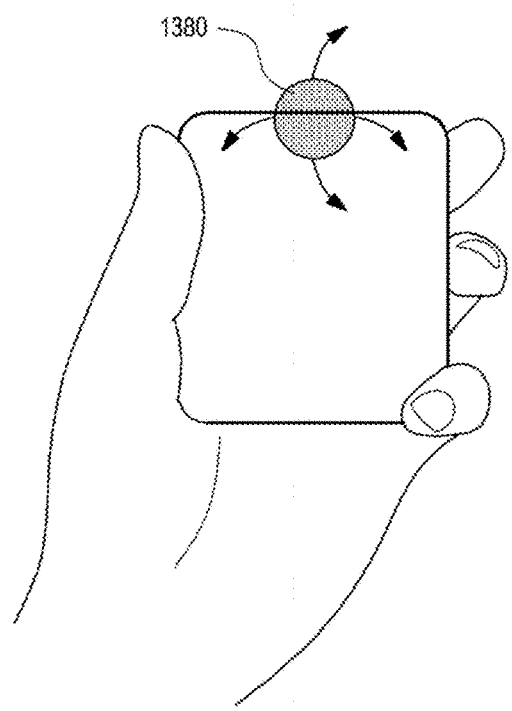

Referring to FIG. 13, when the electronic device corresponds to a foldable electronic device, a user may simply execute specific functions in a state where the electronic device is folded as illustrated in FIG. 13, by using an auxiliary input device 1380 placed on the back surface of the electronic device. The specific functions, for example, may be music playback control, call reception rejection, alarm off, and the like. For example, when the auxiliary input device 1380 corresponds to a trackball, the user may simply control the specific functions without unfolding the electronic device in a state where the electronic device is folded, by moving the ball in up, down, left, and right directions with his/her finger or through a push/release input with respect to the trackball.

The term "module" as used herein may, for example, refer to a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of a dedicated processor, a CPU, an Application-Specific Integrated Circuit (ASIC) chip, a Field-Programmable Gate Arrays (FPGA), and a programmable-logic device for performing operations which has been known or are to be developed hereinafter.

According to various example embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added. Various example embodiments disclosed herein are provided merely to easily describe technical details of the present disclosure and to aid in understanding of the present disclosure, and are not intended to limit the scope of the present disclosure. Therefore, it should be understood that all modifications and changes or modified and changed forms based on the technical idea of the present disclosure fall within the scope of the present disclosure.

What is claimed is:

1. An electronic device comprising:
   a touch screen disposed on a first surface of the electronic device;
   an auxiliary input device comprising input circuitry disposed on a second surface of the electronic device;
   a sensor module comprising at least one sensor; and
   a processor configured to:
   detect a grip of the electronic device using the at least one sensor when a first input is received through the auxiliary input device,
   identify a first area which is a touchable area of the electronic device based on the grip of the electronic device,
   determine a second area, which is a non-touchable area of the touch screen and adjacent to the first area, based on the first area, and
   display a pointer at first coordinates in the second area.

2. The device of claim 1, wherein the sensor module comprises one or more of a plurality of pressure-sensitive sensors, a plurality of touch sensors, or a plurality of proximity sensors, arranged in a bezel of the electronic device.

3. The device of claim 1, wherein the first coordinates in the second area are center coordinates of the second area.

4. The device of claim 1, wherein, when an input is not received through the auxiliary input device during a predetermined time after displaying the pointer, the processor is configured to terminate the display of the pointer.

5. The device of claim 1, wherein the auxiliary input device comprises at least one of: a multi-function stick switch, a touch screen, a trackpad, or a trackball.

6. The device of claim 1, wherein, when a third input is received through the auxiliary input device, the processor is configured to display a movement of the pointer in response to the third input.

7. The device of claim 1, wherein, when an input for selecting an icon at a position of the pointer is received through the auxiliary input device, the processor is configured to select the icon.

8. The device of claim 7, wherein, when a drag input with respect to the selected icon is received through the auxiliary input device, the processor is configured to display the dragging of the selected icon in response to the drag input.

9. A method for controlling an electronic device comprising:
   detecting a grip of the electronic device using at least one sensor of the electronic device when a first input is received through an auxiliary input device of the electronic device;
   identifying a first area which is a touchable area of the electronic device based on the grip of the electronic device;
   determining a second area, which is a non-touchable are of the touch screen and adjacent to the first area, based on the first area; and
   displaying a pointer at first coordinates in the second area.

10. The method of claim 9, wherein the grip of the electronic device is detected using a plurality of touch sensors and/or a plurality of proximity sensors of the electronic device.

11. The method of claim 9, wherein the first coordinates in the second area are center coordinates of the second area.

12. The method of claim 11, further comprising terminating the display of the pointer when an input is not received through the auxiliary input device during a predetermined time after displaying the pointer.

13. The method of claim 11, further comprising displaying a movement of the pointer on the touch screen in response to a second input when the second input is received through the auxiliary input device.

14. The method of claim 9, wherein the auxiliary input device comprises at least one of: a multi-function stick switch, a touch screen, a trackpad, or a trackball.

15. The method of claim 9, further comprising selecting an icon by the pointer when an input for selecting the icon at a position of the pointer is received through the auxiliary input device.

16. The method of claim 15, further comprising displaying the dragging of the selected icon in response to a drag input when the drag input with respect to the selected icon is received through the auxiliary input device.

* * * * *